Patented Jan. 1, 1952

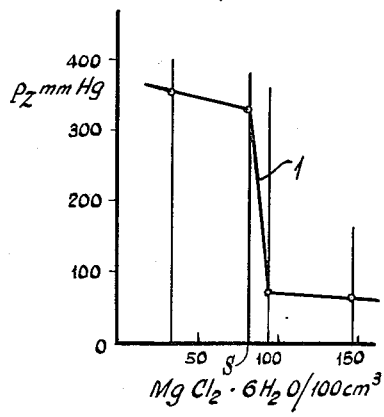
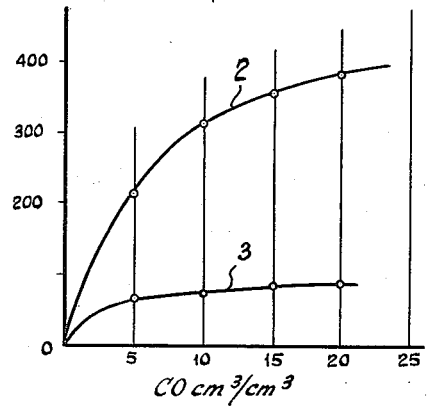
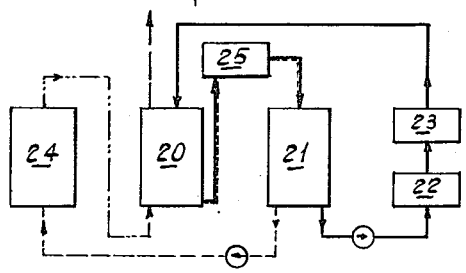
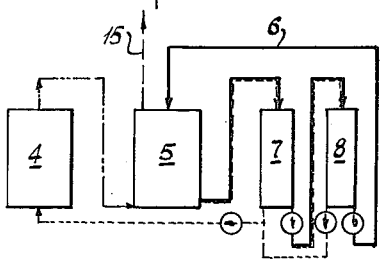
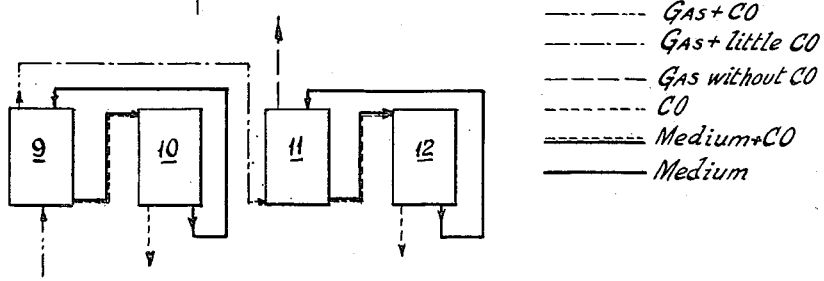
— — — Gas + CO
— · — · Gas + little CO
— — — Gas without CO
- - - - - CO
======= Medium + CO
———— Medium
INVENTOR.
HANS DERINGER.
BY
K. A. Mayr
ATTORNEY.

2,580,527

UNITED STATES PATENT OFFICE 2,580,527

METHOD AND ABSORPTION MEANS FOR SEPARATING AND FOR RECOVERING CARBON MONOXIDE FROM GAS MIXTURES

Hans Deringer, Winterthur, Switzerland, assignor to Sulzer Freres, Societe Anonyme, Winterthur, Switzerland Application June 7, 1947, Serial No. 753,310
In Switzerland June 11, 1946

14 Claims. (Cl. 23—2)

The invention relates to a method for separating and recovering carbon monoxide from gas mixtures with the help of complex compounds of univalent copper in aqueous solutions, dissolved or in suspension, and an absorption medium for carrying out the method.

For the absorption of carbon monoxide from coke-oven gas, water gas, gases for synthetic processes and other technical gas mixtures, complex compounds of the univalent copper and possibly other heavy metals suitable for forming complexes are used, as is well known. For this purpose for instance cuprous oxide, cuprous chloride, cuprous nitrate, cuprous carbonate, cuprous lactate, cuprous formiate, or the univalent cuprous salts of other acids, are dissolved or suspended in aqueous solutions of the respective acids or water soluble salts of the same. Thus for instance cuprous chloride is dissolved or dissolved and suspended in more or less concentrated aqueous solutions of sodium chloride, calcium chloride, magnesium chloride, etc., or in mixtures of such salts. The absorption of carbon monoxide in such absorption means is effected by washing the gas mixtures containing carbon monoxide by means of the absorption means in a known manner in absorption towers containing filling material, shower washers, etc. at normal or increased pressure, and counterflow or uniflow or by bubbling the gas through the absorption means. These absorption means combine the carbon monoxide, possibly together with water or other components, to form more or less unstable cuprous carbon monoxide complexes. The absorption means laden with carbon monoxide release the carbon monoxide in the form of gas, when heated, and/or when the pressure is reduced. Thus the carbon monoxide can be recovered and the absorption means can be regenerated to be reused for absorption.

The conventional absorption means have, at a given temperature and carbon monoxide concentration, definite decomposing pressures of the carbon monoxide compounds and the carbon monoxide partial pressure in the gas mixture treated hereby must be greater than the decomposing pressure of the carbon monoxide compound in the absorption means. For releasing carbon monoxide from the absorption means the carbon monoxide partial pressure must be lower than the decomposing pressure of the carbon monoxide compound.

The suitability of an absorption medium depends on the decomposing pressure of the carbon monoxide compound in said medium and on the variation of this pressure at varying concentration of absorbed carbon monoxide and different temperatures.

Absorption means with low decomposing pressure of the carbon monoxide compound for a wide range of carbon monoxide concentration absorb more carbon monoxide and at greater speed from a gas mixture than absorption means with high decomposing pressure of the carbon monoxide compound and/or with a decomposing pressure of the CO compound sharply rising with the carbon monoxide concentration. Absorption means, with low decomposing pressure of the carbon monoxide compound are better suited to free the gas mixture from carbon monoxide down to a very small CO content than absorption means with high decomposing pressure. With conventional absorption media the pressure of the gas mixture to be treated must be raised considerably in order to free the mixture thoroughly from, or to concentrate the absorption means highly with carbon monoxide, or both.

Absorption means with low decomposing pressure of the carbon monoxide compound hold the carbon monoxide better than absorption means with high decomposing pressure. For decomposing the carbon monoxide compound a greater expansion or a greater vacuum and/or a higher temperature is necessary than with absorption means with higher decomposing pressure.

The energy required for separating carbon monoxide from gas mixtures by means of absorption means and the recovery of carbon monoxide depends not only on the difference between absorption and decomposing temperature of the absorption means, but also on the difference between the absorption and releasing pressure. Since the whole gas mixture must be compressed for the absorption phase of the process and the pressure of only a small part, namely the carbon monoxide and some other accompanying gas must be evacuated for the recovery phase, the total power required is less if the absorption can be carried out at normal or only slightly increased pressure, so that decomposition of the carbon monoxide compound in the absorption means takes place at a greater vacuum, than if the absorption pressure must be great and the carbon monoxide is released at atmospheric or slightly subatmospheric pressure.

It is an object of the present invention to lower the decomposing pressure of the carbon monoxide compound by adding to the absorption medium a substance which lowers considerably the decomposing pressure of the cuprous carbon monoxide compounds. This substance forms a deposit or precipitate in the solution consisting of, or containing said substance.

It is a characteristic feature of the present invention to replace the absorption medium used in the conventional CO absorption and recovery process by a medium consisting of a concentrated solution containing a precipitate reducing the CO compound decomposition pressure whereby said solution is used for solving and suspending the cuprous salts or possibly other heavy metal salts suited for complex compound formation.

As substances for lowering the decomposing pressure, according to the invention, magnesium salts may be used under such conditions that magnesium chloride is formed as or in the deposit. Also carnallite, kainite or other magnesium double salts may be employed.

The word "precipitate" is used in the present specification and claims for designating a customary solid phase which is in equilibrium with the dissolved substance. Magnesium and copper ions can be found usually in the deposit.

The method is of particular importance in the manufacture of town gas, a mixture, for example of coal and water gas, where it is used to remove the poisonous CO as far as possible. As compared with other methods for freeing town gas from poisonous matter, the present method has the great advantage of absorbing a very large percentage of CO at low cost and under the normal pressure conditions prevailing during the manufacture of coal gas.

Further and other objects of the present invention will be hereinafter set forth in the accompanying specification and claims and shown in the drawings which, by way of illustration, show what I now consider to be preferred embodiments of my invention.

In the drawings:

Fig. 1 is a diagram showing the relation between the decomposing pressure of the carbon monoxide compound and the concentration of magnesium chloride in the absorption medium;

Fig. 2 is a diagram illustrating for two absorption media the relation between the decomposing pressure of the carbon monoxide compound and the concentration of the absorbed carbon monoxide in the absorption medium;

Fig. 3 is a diagrammatic showing of a conventional apparatus layout in which the invention may be carried out;

Fig. 4 is a diagrammatic illustration of a modified layout for carrying out a modified form of the invention;

Fig. 5 is a diagrammatic illustration of another modification of an apparatus for carrying out a modified form of the invention.

The process according to the invention for separating and recovering carbon monoxide is carried out in a conventional absorption apparatus. The gas mixture is treated in the usual manner with an absorption medium which, for instance, trickles from the top to the bottom of an absorption tower 20 filled with small hollow cylinders known as Raschig rings or other trickle-producing bodies, while the gas mixture is driven from the bottom to the top of the tower.

The absorption medium, enriched with CO, is tapped off at the bottom of the absorption tower and conducted to a desorption tower 21. In the latter a lower pressure is maintained than in the absorption tower; for instance, with absorption at approximately atmospheric pressure, a vacuum is maintained by withdrawing continuously the released CO gas. Since absorption media tend to foam during desorption, it is advisable to conduct the absorption medium and the CO in the same direction through the desorption tower and to remove both, the absorption medium freed from CO, as well as the CO itself, for example at the bottom of the desorption tower in case the CO laden medium is introduced on top. Thereafter the absorption medium is cleaned of drops in cleaner 22 and cooled in cooler 23 if necessary and conducted back to the absorption tower 20 for absorbing CO. If the process is used in the manufacture of town gas the extracted CO is usually employed for heating the gas or coke-ovens 24; in other industries it is stored and then conducted to the point of use. For intensifying the CO separation the enriched absorption medium may be heated in a heater 25 before or when entering the desorption tower.

The ordinates in Fig. 1 indicate the decomposing pressures in $P_2$ in mm. Hg of a carbon monoxide compound in an absorption medium of cuprous chloride in a magnesium chloride solution and the abscissae the concentration of said solution in grams per 100 cm.$^3$ solution. Line 1 shows the decomposition pressure at a certain temperature, for example 20° C., at various concentrations. This pressure decreases gradually with increasing concentration to a point S where the solution is concentrated, i. e. where there are 83½ grams of $MgCl_2 6H_2O$ in 100 cm.$^3$ solution. Beyond point S a deposit containing magnesium chloride is precipitated and the decomposition pressure decreases materially to about one quarter of what it amounts at the saturation point S. This is for instance the case when there are 100 grams of $MgCl_2 6H_2O$ in 100 ccm. of solution. Further increase of the magnesium chloride deposit does not decrease materially the decomposing pressure. The process according to the invention is not limited to absorption media containing cuprous chloride. Diagrams for media containing other univalent cuprous salts have characteristics similar to those of the diagram shown in Fig. 1.

According to the invention, for example 33 grams of cuprous chloride are added to 100 cm.$^3$ of the superconcentrated solution.

Other absorption media according to the invention may contain cuprous chloride or another univalent cuprous salt in sodium chloride, calcium chloride, and other solutions whereby the addition of magnesium chloride causes the formation of precipitates which reduce the absorption pressure unexpectedly to an extraordinary degree.

Such a medium is produced, for example, by adding 33 grams of cuprous chloride to 100 cm.$^3$ suspension which contains two or more chlorides, one of them being $MgCl_2$, in saturated or almost saturated concentration.

It has been found that besides the extraordinary decrease of the decomposing pressure, this pressure changes very little with increasing CO concentration in the new absorption medium, whereas with media without a precipitate or deposit the decomposing pressure of the CO compound increases considerably with increased CO concentration. Line 2 in Fig. 2 shows the decomposition pressure $P_2$ in mm. Hg, ordinates, in dependence on the CO concentration in cm.$^3$ per cm.$^3$ of a medium containing cuprous chloride in saturated $MgCl_2$ solution, abscissae. If the CO concentration increases from .5 to 20 cm.$^3$/cm.$^3$ medium, the decomposing pressure is almost doubled. With the same medium containing precipitated MgCl₂, the decomposing pressure is much lower, and increases, at the same temperature, only 30% at the same increase of CO concentration. This is apparent from line 3 in Fig. 2.

Absorption media with a deposit according to the invention not only absorb much greater amounts of CO but can remove from the treated gas mixtures almost all CO without necessitating increase of the pressure of the gas mixtures above atmospheric pressure.

Addition of MgCl₂ as deposit to an absorption medium of cuprous chloride in concentrated MgCl₂ solution increases according to Fig. 2 the CO absorption from 1.5 to 20 cm.³/cm.³ absorption medium at a temperature of 20° C. and a CO partial pressure of 80 mm. Hg in the treated gas mixture.

The mean decomposing pressure of the CO compound between 10 and 20 cm.³ CO/cm.³ absorption medium concentration is reduced, at a temperature of 10° C., from 180 mm. Hg with a merely saturated solution to 35 mm. Hg with a solution containing MgCl₂ deposit.

The amount of power and absorption medium needed for obtaining the same result, say removing eight of the ten per cent of CO contained in a gas mixture, is considerably less when using a medium according to the invention than when using conventional media. If 10 cm.³ CO are absorbed by and afterwards removed from 1 cm.³ absorption medium without change in temperature, the absorption pressure, when using a medium as characterized by line 2 in Fig. 2 and having no precipitate, must be 4.4 atmospheres absolute and the desorption pressure must be 75 mm. Hg. If absorption is carried out at a pressure higher than 60 atmospheres, desorption can be effected at atmospheric pressure.

If a medium as per line 3 in Fig. 2 and having a deposit, is used, absorption can be effected at 1 atmosphere absolute and desorption at 25 mm. Hg (14 mm. HgCO pressure+11 mm. Hg steam pressure).

The power consumption in the first example set forth above is about 18 horsepower hours and in the third case with a medium according to the invention only about 9 horsepower hours per 100 m.³ gas mixture. This is due to the fact that with the new absorption medium the absorption-desorption cycle is transferred from a high pressure range into a subatmospheric range.

Evacuation, i. e. reduction of pressure for the decomposition or CO recovering phase, may be done in stages and at first the bulk of the CO removed at low vacuum and only the remainder of the CO be removed at the high vacuum needed for its extraction whereby power consumption is reduced further.

Fig. 4 is a diagrammatic illustration of a layout for carrying out this process. Numeral 4 designates a coke oven or any other source of a gas mixture containing CO. The gas mixture is conducted into the absorption tower 5 where it is treated with an absorption medium according to the invention which is supplied by conduit 6. The medium loaded with CO is conducted into desorption tower 7 and the gas mixture from which a substantial portion of the CO has been removed is conducted from tower 5 through outlet 15. In tower 7 a relatively low vacuum is maintained and only a portion of the CO absorbed by the absorption medium extracted therefrom. The medium still containing CO is conducted into a second desorption tower 8 wherein a higher vacuum than in tower 7 is maintained and almost all of the CO still contained in the medium is removed therefrom. The medium now substantially free from CO is conducted back into absorption tower 5. On its way thereto it may be cleaned and cooled in the conventional manner. If the process is used in combination with coal gas production the CO desorbed in towers 7 and 8 can be returned to the coke oven 4 and used as fuel therein. Of course, more than two different pressure desorption stages may be arranged.

The lower the CO content of the gas to be treated the more evident are the advantages and savings when using an absorption medium having a low decomposition pressure of the CO compound.

Instead of treating the gas mixture from which CO must be extracted with one absorption medium only or once only with the same medium several consecutive treatments may be advisable and are within the scope of the present invention.

Absorption media with different decomposition pressures may be used and the gas mixture treated first with one with a relatively high and thereafter with one of low decomposing pressure. More than two consecutive treatments with decreasing decomposition pressures may be employed.

The gas mixture may be treated first with a cuprous chloride solution without deposit and a portion of the CO extracted which can easily be removed from the compound it formed. The CO remaining in the gas mixture is then still high and can be removed in one or more stages with an absorption medium containing a deposit until the CO content of the gas mixture reaches the desired minimum.

Two or more treatments of a gas mixture may be so made that a certain amount of absorption medium circulates individually in each treatment through an absorption and a desorption apparatus. The medium may be of the same composition in each individual cycle or media of different compositions may be used in the different cycles. The pressure reduction, i. e. the vacuum is greater in the subsequent cycle or cycles than in the first cycle. The gas mixture passes consecutively through the apparatus of the different cycles and leaves the last with a minimum content of CO.

A layout of apparatuses for carrying out the last described processes is shown in Fig. 5. The gas mixture from which CO must be removed is first treated in an absorption tower 9. Absorbed CO is extracted in decomposition tower 10 and the medium returned to tower 9. Gas mixture still containing CO is conducted into a second absorption tower 11 and treated with absorption medium of an independent circuit. The medium loaded with CO in tower 11 is conducted into desorption tower 12 where a lower pressure is maintained than in tower 10. The medium from which CO has been removed is reused in tower 11.

To prevent foaming at the extraction of the CO from the medium conventional substances such as phenol or higher alcohols may be added to the absorption medium.

While I believe the above described embodiments of my invention to be preferred embodiments, I wish it to be understood that I do not desire to be limited to the exact details of method and apparatus shown and described, for obvious modifications will occur to a person skilled in the art.

I claim:

1. The process of separating carbon monoxide from a gas mixture by contacting the mixture with an aqueous medium containing a univalent cuprous salt and a magnesium salt precipitate.

2. The process of separating and recovering carbon monoxide from a gas mixture comprising the steps of contacting the mixture with an aqueous medium containing a univalent cuprous salt and a magnesium salt precipitate for absorbing the carbon monoxide therein and separating it from the mixture, and reducing the pressure on said aqueous medium for recovering the carbon monoxide therefrom.

3. The process of separating and recovering carbon monoxide from a gas mixture comprising the steps of contacting the mixture with an aqueous medium containing a univalent cuprous salt and a magnesium salt precipitate for absorbing the carbon monoxide therein and separating it from the mixture, and increasingly reducing in consecutive stages the pressure on the aqueous medium for recovering the carbon monoxide therefrom.

4. The process of separating carbon monoxide from a gas mixture by contacting the mixture with an aqueous medium containing a univalent cuprous salt for absorbing a part of the carbon monoxide, and by contacting the remainder of the mixture with an aqueous medium containing a univalent cuprous salt and a magnesium salt precipitate.

5. The process of separating and recovering carbon monoxide from town-gas comprising the steps of contacting the town-gas at normal town-gas manufacturing pressure with an aqueous medium containing a univalent cuprous salt and a magnesium salt precipitate for absorbing the carbon monoxide therein and separating it from the town-gas, and reducing the pressure on said aqueous medium for recovering the carbon monoxide therefrom.

6. The process of separating carbon monoxide from a gas mixture by contacting the mixture with an aqueous medium containing a univalent cuprous salt and a precipitate comprising a magnesium salt.

7. The process of separating carbon monoxide from a gas mixture by contacting the mixture with an aqueous medium containing a univalent cuprous salt and a precipitate comprising carnallite.

8. An absorption medium for separating and recovering carbon monoxide from a gas mixture, consisting of an aqueous fluid containing a univalent cuprous salt and a magnesium salt precipitate.

9. An absorption medium as defined in claim 8, said magnesium salt being magnesium chloride.

10. An absorption medium as defined in claim 8, said magnesium salt being carnallite.

11. An absorption medium for separating and recovering carbon monoxide from a gas mixture, consisting of an aqueous fluid containing a univalent cuprous salt, and a crystalline deposit in said fluid consisting of magnesium chloride.

12. An absorption medium for separating and recovering carbon monoxide from a gas mixture, consisting of an aqueous fluid containing a univalent cuprous salt, and a crystalline deposit in said fluid consisting of carnallite.

13. An absorption medium for separating and recovering carbon monoxide from a gas mixture, consisting of an aqueous fluid containing a univalent cuprous salt, and having magnesium chloride added in an amount of substantially 100 grams per 100 ccm. of the fluid to which it is added.

14. An absorption medium for separating and recovering carbon monoxide from a gas mixture, consisting of an aqueous fluid containing a univalent cuprous salt, a magnesium salt precipitate, and phenol as a foam inhibiting agent.

HANS DERINGER.

REFERENCES CITED

The following references are of record in the file of this patent:

UNITED STATES PATENTS

| Number | Name | Date |
|---|---|---|
| 1,032,536 | Gerli et al. | July 16, 1912 |
| 1,716,479 | Bilsky | June 11, 1929 |
| 1,792,939 | Stampe | Feb. 17, 1931 |
| 2,390,899 | Reed | Dec. 11, 1945 |

FOREIGN PATENTS

| Number | Country | Date |
|---|---|---|
| 3,179 | Great Britain | of 1875 |
| 6,107 | Great Britain | of 1887 |
| 304,345 | Great Britain | Jan. 17, 1929 |
| 362,552 | Great Britain | Dec. 10, 1931 |